Nov. 7, 1933.  E. F. NORELIUS  1,934,627

TRACK LINK

Filed July 21, 1930   2 Sheets-Sheet 1

Inventor
E. F. Norelius by
Attorney

Nov. 7, 1933.  E. F. NORELIUS  1,934,627

TRACK LINK

Filed July 21, 1930  2 Sheets-Sheet 2

Inventor
E. F. Norelius
by
Attorney

Patented Nov. 7, 1933

1,934,627

UNITED STATES PATENT OFFICE 1,934,627

TRACK LINK

Emil F. Norelius, Springfield, Ill., assignor to Allis-Chalmers Manufacturing Company, Milwaukee, Wis., a corporation of Delaware Application July 21, 1930. Serial No. 469,408

6 Claims. (Cl. 305—10)

This invention relates to a track link adapted to form a part of a chain track for tractors or other vehicles of the self-laying track type.

An object of the invention is to provide an improved track link which is simple and compact in construction and efficient in operation.

Another object of the invention is to provide a single piece track link of a design which lends itself for forging purposes, preferably drop forging.

Still another object of the invention is to manufacture the track links more economically by reducing the expenses for machining operations.

These and other objects and advantages of the inventions will be apparent from the following description.

A clear conception of an embodiment of the invention and of the operation of a chain track constructed in accordance therewith may be had by referring to the drawings accompanying and forming a part of this specification in which like reference characters designate the same parts in the various views.

Figure 1:
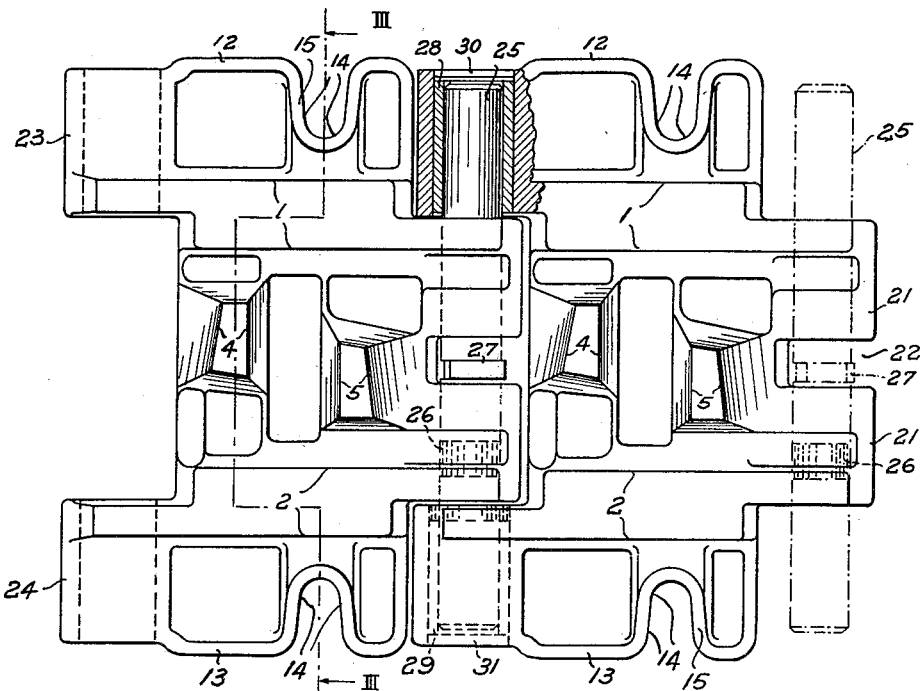
Fig. 1 is a plan view showing two track links hinged together, part of one link being shown in section.

The track links shown in the drawings are of the lug drive type in which each individual link has an upwardly projecting lug at each end, and in which a flanged tooth of a drive sprocket enters between the lugs of adjoining links.

As far as the use of drive lugs on the track links and the use of flanged teeth on the sprocket wheel are concerned, the chain tread mechanism shown in the drawings is similar to the chain tread mechanism disclosed in United States Patent No. 1,222,295, granted to George C. Jett, April 10, 1917. The track link according to the present invention is an improvement over the track links as disclosed in said earlier patent.

Figure 2:
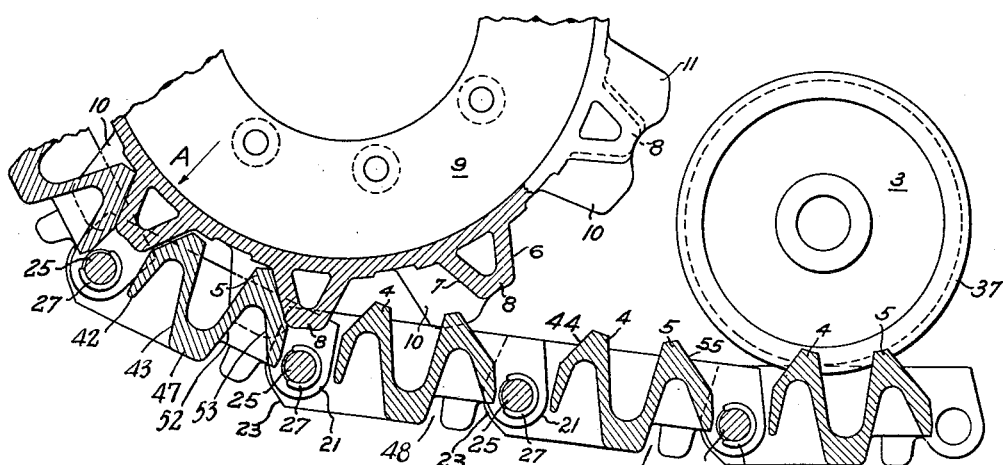
Fig. 2 is a central longitudinal section through a portion of a chain track engaged by a sprocket wheel and a weight bearing wheel.

The numerals 1 and 2 designate the track portions of the link, and 3 indicates the weight bearing wheels of the tractor, which travel on these track portions. 4 and 5 are drive lugs formed at each end of the link and projecting upwardly beyond the top of the track portions. The drive faces 44 and 55 of the lugs 4 and 5 respectively are inclined toward the ends of the link and adapted to be engaged by corresponding drive faces 6 and 7 of teeth 8 formed on a power driven sprocket wheel 9. The drive lugs 4 and 5 are offset relative to each other and the sprocket teeth 8 have guide flanges 10 and 11 to prevent the track chain from running off the sprocket wheels. The track portions 1 and 2 each have a solid crown indicated by 40 and 41, respectively, in Fig. 3, an outer side wall indicated by 32 and an inner side wall indicated by 33. The drive lugs 4 and 5 also have solid tops and are otherwise of hollow formation, the drive lug 4 having a front end wall 42, a rear end wall 43 (shown in Fig. 2) and a side wall 45 (shown in Fig. 3). The drive lug 5 is similarly formed having a front end wall 52, a rear end wall 53 (shown in Fig. 2) and a side wall similar to the side wall 45 of the drive lug 4. The end walls 42 and 43 of the drive lug 4 merge with the track portion 1, the front end wall 42 meeting the inner side of the track portion near one end thereof, and the rear end wall 43 meeting the inner side wall 33 of the track portion. Between the front and rear end walls 42 and 43 the top of lug 4 is connected to the crown 40 of the track portion 1 through a wall 35 (Fig. 3) which first extends downwardly from the lug top and is then curved to meet the crown somewhat below its top surface 38 so as to form a channel shaped recess between the lug and the crown, permitting the flange 37 of the wheel 3 to pass. The side wall 45 of the lug 4 is connected with the inner side wall 33 of the track portion 2 through a horizontal web 46, there being a comparatively wide space between the lug 4 and the track portion 2 to permit entrance of the guide flange 11 of the sprocket wheel 9 between the lug 4 and the track portion 2. The space between the lug 4 and the track portion 2 also permits the flange 37 of the load supporting wheel 3 rolling on said track portion to pass between the lug 4 and the crown 41. The lug 5 merges with the track portion 2 and is connected with the track portion 1 in a similar manner as the lug 4 merges with the track portion 1 and as this lug is connected with the track portion 2, which will be understood without further explanation. The guide flange 10 of the sprocket wheel 9 enters the space between the lug 5 and the track portion 1 as best shown in Fig. 4. The rearward end wall 43 of the lug 4 and the forward end wall 52 of the lug 5 are connected at their lower ends by a bottom portion 47 as best shown in Fig. 2. The bottom portion 47 extends between the inner side walls of the track portions 1 and 2, and the lower surface thereof facing the ground is on a level somewhat lower than the level of the web portion 46 connecting the drive lug 4 with the inner side wall of the track portion 2, (Fig. 3), and this web portion as well as the corresponding web portion connecting the lug 5 with the inner side wall of the track portion 1 both join the bottom portion 47 somewhat above the level of the ground tread surface of said bottom portion.

Figure 3:
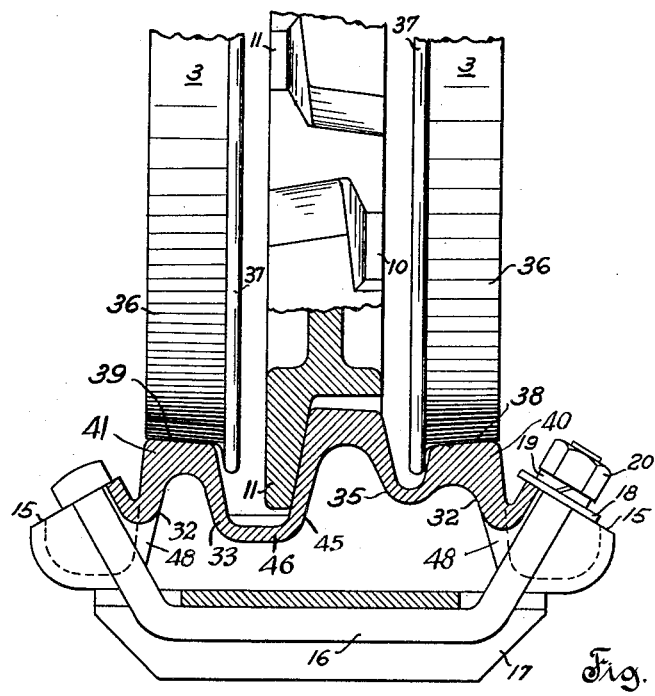
Fig. 3 is a section on line III—III of Fig. 1, showing a grouser attached to the track link, and cooperating weight bearing wheels and part of a sprocket wheel in elevation.
Figure 4:
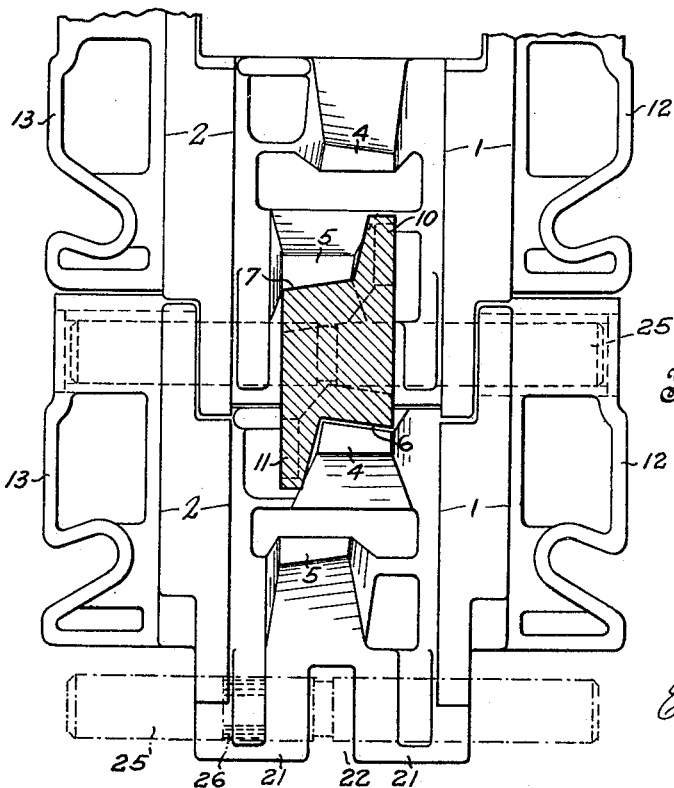
Fig. 4 is a plan view looking in the direction of arrow A in Fig. 2 and showing two track links in engagement with a tooth of a drive sprocket.

The outer side wall 32 of the track portion 1 is notched out to provide an aperture 48 intermediate the ends of the track portion, the aperture being shown in Fig. 3 and, partly covered by the bottom portion 47, in Fig. 2. The track portion 2 has a similar aperture 48 in its outer side wall 32 as shown in Fig. 3. A marginal tread portion 12 extends laterally from the lower end of the outer side wall 32 of the track portion 1, and a similar marginal tread portion 13 extends laterally from the outer side wall 32 of the track portion 2 the marginal tread portions extending in a substantially horizontal plane and having ground tread surfaces level with the ground tread surface of the bottom portion 47. Each marginal tread portion comprises a section extending laterally from the outer side wall of the adjacent track portion forwardly of the aperture 48 therein, and another section extending laterally from said outer side wall rearwardly of the aperture 48, the spacing between the sections providing a recess in each of the marginal tread portions of a width equal to the width of the aperture 48. The ends of the forward and rearward sections adjacent to the aperture 48 are braced against the adjacent track portion by an upstanding wall 14 rising from the marginal tread portion and merging with the outer side wall of said track portion. The upstanding wall comprises substantially vertical portions connecting the marginal tread portion with the adjacent track portion, and a semi-circular top portion at the upper end of the aperture 48, connecting the vertical portions of the wall. The semi-circular top portion merges with the outer side wall of the adjacent track portion, and is inclined relative thereto as shown in Fig. 3. The upper edge 15 of the upstanding wall 14 extends in an inclined plane rising towards the center of the track link. The spaces between the forward and rearward sections of the marginal tread portions and the apertures 48 in the outer side walls 32 of the track portions 1 and 2 are adapted to receive a mounting bolt 16 for a grouser 17, as shown in Fig. 3. The mounting bolt 16 has a T head engaging the inclined edge 15 of the upstanding wall 14 at one side of the track link and a washer 18 supported by the inclined edge 15 of the upstanding wall 14 at the other side of the link forms a seat for a lock washer 19 and a nut 20 threaded upon the other end of the bolt 16. The grouser is of any suitable design and is pressed by the bolt 16 against the ground tread side of the bottom portion 47 and against the ground tread sides of the marginal tread portions 12 and 13.

The links are hinged together in the following manner. At one end of each link there is a longitudinally projecting hinge portion 21 of a relatively large width extending crosswise approximately from the center of the track portion 1 to the center of the track portion 2. The inner portions of the tracks are longitudinally extended and merge with the outer portions of the hinge projection 21. A deep slot 22 at the middle of the hinge projection 21 is provided for a purpose which will be described later. At the other end of the link there are two longitudinally projecting hinge portions 23 and 24 spaced apart in crosswise direction, the width of the space corresponding substantially to the width of the hinge projection 21. At this end of the track link the outer portions of the tracks are longitudinally extended and merge with the inner portions of the hinge projections 23 and 24, respectively. The outer hinge portions are formed integrally with the marginal tread portions 12 and 13, respectively, and extend substantially across the full width thereof as best shown in Figure 1.

A cross pin 25 extending substantially over the full width of the link serves to hold two adjoining links together. The middle portion of the pin 25 is securely held in the hinge projection 21 of one link, and the hinge projections 23 and 24 of the next link are rotatably held on the laterally extending ends of the pin. Preferably the pin is pressed into a bore of the projection 21 and has a portion 26 provided with a fine straight knurl which, when pressed into the bore, insures a permanent grip. Moreover, the pin is secured against axial displacement by a clip 27 which is slipped over the pin and fits into a suitable groove provided at the middle portion thereof. The slot 22 in the hinge projection 21 is provided at right angles to the hinge axis for putting the clip 27 in place. This slot 22 can be formed from the end of the link or from the bottom. The outer hinge projections 23 and 24 are preferably fitted with bronze bushings 28 and 29 respectively, which are held in place by expansion plugs 30 and 31 or any other suitable means.

The top surfaces 38 and 39 of the track portions 1 and 2 respectively, are inwardly inclined as best shown by Fig. 3, and the weight bearing wheels 3 running on these surfaces have a conical outer rim surface 36, the slope of the cone corresponding substantially to the inclination of the top surfaces 38 and 39, respectively. It will be apparent that the oppositely inclined top surfaces 38 and 39 of the track portions and the corresponding conical shape of the rim surfaces 36 will aid the weight bearing wheels 3 to stay properly centered on the track belt,—and in consequence thereof the wear of the guide flanges 37 which are provided on the inner sides of the wheels 3 will be greatly reduced. Preferably the inner top edges of the track portions 1 and 2 are rounded off as shown, so that the flanges 37, if they come in contact with the respective track portions, are smoothly guided and not cut by any sharp edges.

It will be seen from an inspection of the drawings that the track link is of a general design which readily lends itself to forging purposes. It may directly be forged in a set of dies, one die being shaped to form the upper side of the link and the other die being shaped to form the lower side of the link. The various depressions on the ground tread side of the link, in addition to facilitating forging, have been found to be valuable in that they give a certain amount of traction.

It should be understood that it is not intended to limit the invention to the exact details of construction herein shown and described, for various modifications within the scope of the claims may occur to persons skilled in the art.

It is claimed and desired to secure by Letters Patent:

1. A one piece link for endless chain tracks, comprising two parallel track portions connected by an intervening tread portion, a pair of drive lugs extending upwardly from said intervening tread portion, marginal tread portions extending laterally from said track portions, lateral hinge portions at one end of the link substantially coextensive with the widths of said marginal tread portions and formed integrally with the marginal tread portions along the full widths of the latter, and an inner hinge portion at the other end of the link, formed integrally with said intervening tread portion, said track portions having each a solid top merging with said inner and one of said lateral hinge portions, and inner and outer side walls respectively connecting said top with said intervening tread portion and with the adjacent marginal tread portion, and said drive lugs having each a solid top and side walls connecting said solid lug top with said intervening tread portion and with the inner side wall of one of said track portions.

2. A one piece link for endless chain tracks, comprising two longitudinal track portions of hollow formation each having an outer and an inner side wall, the outer side wall of each track portion having an aperture in its lower part, an intervening portion connecting the inner side walls of said track portions, a marginal tread portion extending laterally from each track portion and having a recess meeting said aperture of the outer side wall of the adjacent track portion, and reinforcing means between said track portions and said marginal tread portions, said reinforcing means including, at one end of the link, outer hinge portions extending transversely to said track portions and formed integrally with said marginal tread portions along the full widths of the latter, and, near the other end of the link at each side thereof, walls rising from said marginal tread portion forwardly and rearwardly of said recess therein and merging with the outer side wall of the adjacent track portion forwardly and rearwardly of said aperture in the latter.

3. A one piece link for endless chain tracks, comprising two longitudinal track portions of hollow formation each having an inner side wall, the outer side wall of each track portion having an aperture in its lower part, an intervening tread portion connecting the inner side walls of said track portions, a marginal tread portion extending laterally from each track portion and having a recess meeting said aperture of the outer side wall of the adjacent track portion, a drive lug rising from said intervening tread portion in close proximity to one of said track portions, and merging with said inner side wall thereof, another drive lug rising from said intervening tread portion in close proximity to the other track portion and merging with said inner side wall of said other track portion, and reinforcing means between said track portions and said marginal tread portions, said reinforcing means including, at one end of the link, outer hinge portions extending transversely to said track portions and formed integrally with said marginal tread portions along the full widths of the latter, and, near the other end of the link at each side thereof, walls rising from said marginal tread portion forwardly and rearwardly of said recess therein and merging with the outer side wall of the adjacent track portion forwardly and rearwardly of said aperture in the latter.

4. A one piece link for endless chain tracks, comprising two longitudinal track portions of hollow formation each having an outer and an inner side wall, an intervening tread portion connecting the inner side walls of said track portions, a drive lug of hollow formation rising from said intervening tread portion in close proximity to one of said track portions and merging with said inner side wall thereof, and another drive lug of hollow formation rising from said intervening tread portion in close proximity to the other track portion and merging with said inner side wall of said other track portion.

5. A one piece link for endless chain tracks, comprising two longitudinal track portions of hollow formation each having an outer and an inner side wall, the outer side wall of each track portion having an aperture in its lower part, an intervening tread portion connecting the inner side walls of said tread portions, a marginal tread portion extending laterally from each track portion and having a recess meeting said aperture of the outer side wall of the adjacent track portion, a drive lug rising from said intervening tread portion in close proximity to one of said track portions and merging with said inner side wall thereof, another drive lug rising from said intervening tread portion in close proximity to the other track portion and merging with said inner side wall of said other track portion, and, intermediate the ends of the link at each side thereof, walls rising from said marginal tread portion forwardly and rearwardly of said recess therein and merging with the outer side wall of the adjacent track portion forwardly and rearwardly of said aperture in the latter.

6. A one piece link for endless chain tracks, comprising a tread portion, parallel track portions each having longitudinal side walls rising from said tread portion and connected by a solid top, and a drive lug associated with each track portion, each of said drive lugs having front and rear wall portions rising from said tread portion, the space between said side walls of each track portion and the space between said front and rear wall portions of each drive lug being open at the bottom, and each of said drive lugs being connected with a side wall of its associated track portion, said front and rear wall portions of each drive lug merging with said side wall.

E. F. NORELIUS.